United States Patent

Desens et al.

Patent Number: 5,871,062
Date of Patent: Feb. 16, 1999

[54] METHOD AND DEVICE FOR SPEED AND DISTANCE CONTROL FOR A MOTOR VEHICLE

[75] Inventors: Jens Desens, Esslingen; Zoltan Zomotor, Stuttgart; Stefan Hahn, Denkendrof, all of Germany

[73] Assignee: Mercedes-Benz AG, Germany

[21] Appl. No.: 635,265

[22] Filed: Apr. 15, 1996

[30] Foreign Application Priority Data

Apr. 13, 1995 [DE] Germany ................. 195 14 023.0

[51] Int. Cl.⁶ .................................................. B60T 7/12
[52] U.S. Cl. ............................................................ 180/169
[58] Field of Search .................................. 180/169, 170, 180/167; 364/461, 424.083; 367/909; 340/435, 436, 903

[56] References Cited

U.S. PATENT DOCUMENTS

| 5,309,137 | 5/1994 | Kajiwara | 340/436 |
| 5,400,864 | 3/1995 | Winner et al. | 180/169 |
| 5,521,579 | 5/1996 | Bernhard | 180/169 X |

FOREIGN PATENT DOCUMENTS

| 0 501 345 | 9/1992 | European Pat. Off. |
| 29 00 461 | 7/1980 | Germany . |
| 34 38 632 | 5/1985 | Germany . |
| 36 22 447 | 1/1988 | Germany . |
| 42 00 694 | 7/1993 | Germany . |
| 42 09 060 | 9/1993 | Germany . |
| 43 13 568 | 6/1994 | Germany . |
| 5-159198 | 6/1993 | Japan . |
| 2265242 | 9/1993 | United Kingdom . |

*Primary Examiner*—Charles T. Jordan
*Assistant Examiner*—Charles R. Ducker
*Attorney, Agent, or Firm*—Evenson, McKeown, Edwards & Lenahan, P.L.L.C.

[57] ABSTRACT

A method and a device for controlling the speed of a motor vehicle and its distance from a vehicle travelling in front are provided. The speed is controlled as long as no vehicle travelling in front is located within a prescribed detection area in front of the vehicle and the distance from the vehicle travelling in front is controlled if a vehicle is located in the detection area. The desired distance for the distance control is set after an instruction for a lane change to the left has been triggered, to a value which is smaller than the value before this instruction was triggered, but is at least as large as a prescribed minimum distance. Alternatively, the actual acceleration of the vehicle is limited to a prescribed maximum value if a vehicle travelling in front moves out of the prescribed detection area in front of the vehicle during the time that an instruction for a lane change to the right is set. In this way, fast overtaking maneuvers can be performed within the control and/or lane changes to the right can be carried out without undesired acceleration effects.

8 Claims, 3 Drawing Sheets

METHOD AND DEVICE FOR SPEED AND DISTANCE CONTROL FOR A MOTOR VEHICLE

BACKGROUND AND SUMMARY OF THE INVENTION

The invention relates to a method for controlling the speed of a motor vehicle and its distance from a vehicle travelling in front, in which method the speed is controlled about a prescribed desired speed as long as no vehicle travelling in front is located within a prescribed detection area in front of the vehicle and the distance from a vehicle travelling in front is controlled about a prescribed desired distance as long as a vehicle travelling in front is located within the prescribed detection area in front of the vehicle. The invention further relates to a device which is operable for carrying out the method.

A method of this type is used in particular in speed regulators having distance control. In the absence of a vehicle travelling within a prescribed detection area in front of the vehicle, speed control is carried out in accordance with the mode of operation of a conventional speed regulator. As soon as a vehicle travelling in front is detected in the prescribed detection area at the front, the system switches over from the speed control to a distance control. The subsequent distance control ensures that a specific, usually speed-dependent distance from the vehicle travelling in front is maintained.

A method of this type is described in German Patent document 42 09 060 A1. In this reference, furthermore, provision is made for an adaption of the desired distance for the distance control to the driving characteristics, during which adaption the respective desired distance value is modified incrementally as a function of a reaction time which is derived from the driving characteristics and as a function of the detected speed of the vehicle itself. This is intended to permit prescribed values of the desired distance of the distance control which are more acceptable for the user because they are matched to his driving characteristics.

With these combined speed-control and distance-control methods, there are problems with respect to the characteristics when changing lanes. For example, an overtaking maneuver with the control method activated takes longer than in the case of manual driving. This is because in the manual mode the driver can already accelerate before the lane change, whereas when the method is activated, owing to the control of the distance from the vehicle which is travelling in front and is to be overtaken, it is necessary first to change lane before an acceleration is permitted. A further difficulty arises if, when the distance control is activated, the driver would like to change to a lane located further to the right. The method then changes from the distance control to the speed control as soon as the vehicle travelling in front has moved out of the detection area at the front. This may possibly result in the occurrence of a vehicle acceleration which is not desired by the driver in order to reach the desired speed which has been set. This is undesired in many cases, for example when turning into an exit lane of a motorway.

In German Patent document 42 00 694 A1, a method for speed and distance control of a vehicle is described. In this method, the current distance and the instantaneous speed are detected and desired values for distance and speed are determined from them and set. The longitudinal dynamics of the vehicle are controlled by a desired acceleration value which depends, in a situation-dependent manner, on the desired distance value and/or on the desired speed value. This makes it possible to effectively switch over between a distance control and a speed control. In this method, if the driver triggers an instruction for a lane change to the left, a previously active distance control is deactivated for a prescribed time period of, for example, two seconds. This makes it possible for the driver, in the case of an overtaking maneuver, already to accelerate the vehicle in the current lane if the distance drops below the normal safe distance from the vehicle travelling in front, which takes place for example controlled along a prescribable speed profile up to the speed desired by the driver. After this time period expires, the distance control or speed control is re-activated. If the driver triggers an instruction for a lane change to the right, the distance control is likewise deactivated. In this case, depending on what the driver's intention is detected to be, the instantaneous positive acceleration state is maintained or the vehicle is accelerated to the desired speed prescribed by the driver. This is insofar as the instantaneous influence of the distance control permits this.

In the Japanese Patent document JP 5-159198 (A), a method for controlling the speed of a motor vehicle is described. In this method, a required distance between vehicles is calculated as a function of the vehicle speed and the vehicle speed is controlled in order to bring about this distance. In the case of lane changes for overtaking a vehicle, the distance between the vehicles is changed to the required distance between the vehicles after a lane change has been completed, and is maintained up to the end of the overtaking maneuver. After the overtaking maneuver is terminated, the distance between the vehicles is successively lengthened in order to be set to the normal distance between the vehicles. In this way, a vehicle travelling behind is prevented from suddenly moving up close by maintaining the distance between the vehicles after a respective lane change.

The technical problem on which the invention is based is to provide a combined method for speed and distance control of the type mentioned at the beginning, which method has satisfactory control characteristics even when changing lanes, and to provide a device suitable for carrying out the method.

This problem is solved by a method for controlling a speed of a motor vehicle and its distance from a vehicle travelling in front. The speed is controlled about a prescribed desired speed as long as no vehicle travelling in front is located within a prescribed detection area in front of the vehicle. The distance from a vehicle travelling in front is controlled about a prescribed desired distance as long as a vehicle travelling in front is located within the prescribed detection area in front of the vehicle. After an instruction for a lane change to the left has been triggered, the desired distance for the distance control is set to a value which is smaller than a value before the instruction for a lane change to the left was triggered, but which is at least as large as a prescribed minimum distance. The method also operates such that after an instruction for a lane change to the left has been triggered, the system changes over from a distance control to an acceleration control and a minimum distance is prescribed. The acceleration control is terminated when the distance drops below the prescribed minimum distance and the system changes back over to a distance control. Further, the method operates such that if a vehicle travelling in front moves out of the prescribed detection area in front of the vehicle during a time that an instruction for a lane change to the right is set, the actual acceleration of the vehicle is limited to a maximum value.

The device for carrying out the method includes a speed control unit, a distance control unit, and a detector for a triggered lane change instruction. The device further includes a system which, after the triggering of an instruction for a lane change to the left has been detected, sets the desired distance for the distance control to a value which is smaller than the value before the instruction for a lane change to the left was triggered, but which is at least as large as a prescribed minimum distance. Alternatively or in addition thereto, the device includes a system for limiting the actual acceleration of the vehicle to a maximum value during the detection of a set instruction for a lane change to the right if a vehicle travelling in front moves out of the prescribed detection area in front of the vehicle.

By using the method according to the present invention, it is possible to carry out overtaking or passing maneuvers with the control method kept active just as quickly as in the case of manual driving. For this purpose, according to the method, a reduction of the desired distance for the distance control is provided at that moment at which an instruction for a lane change to the left is set, which indicates a desire to overtake or pass. The reduction of the desired distance with the distance control maintained has the result that the vehicle can already be accelerated in the initial overtaking phase in which it is still in the previous lane, as is correspondingly carried out by the driver in the case of a manually controlled overtaking maneuver. Here, if desired, the vehicle can be accelerated by the control method at the start of overtaking phases up to the prescribed desired speed of the speed control in the previous lane as long as the distance from the vehicle travelling in front permits this.

In an advantageous embodiment of the invention, the reduced desired distance in the case of lane change instructions to the left, on the one hand always remains above a desired minimum distance and, on the other hand, is matched to the respective instantaneous situation by being reduced in proportion to the previous desired distance value which is itself known to be prescribed as a function of the driving situation, for example as a function of the driving characteristics, of the weather, of the vehicle's own speed and of the selected reaction time.

With the method according to the invention, it is contemplated that when an instruction for a lane change to the left has been detected, a previously activated distance control is terminated. At the same time, the system changes over to an acceleration control phase. In addition, a minimum distance from the vehicle travelling in front is prescribed which is smaller than the desired distance of the preceding distance control. The system changes back over from the acceleration control to the distance control if the distance drops below this minimum distance during the acceleration phase. In this way it is ensured that, even during the acceleration phase, a vehicle is automatically prevented from dangerously driving up too close to the vehicle travelling in front.

The method according to the invention prevents undesired acceleration effects in those cases in which, after a lane change to the right, a vehicle travelling in front and previously located in the detection area moves out of the detection area. For this purpose, the actual acceleration of the vehicle is limited to a prescribabale maximum value for the subsequent speed control.

An advantageous embodiment of the invention results in advantageous driving characteristics when changing lanes to the right in that a positive acceleration which may be present at the time when the lane change is requested is maintained and otherwise an acceleration-free lane change is executed.

According to the present invention, a device is provided for carrying out the methods.

Other objects, advantages and novel features of the present invention will become apparent from the following detailed description of the invention when considered in conjunction with the accompanying drawings.

DETAILED DESCRIPTION OF THE DRAWING

A preferred embodiment of the invention is explained below in greater detail with reference to the figure.

For carrying out the method, it is suitable to use a device in the form of a so-called speed regulator with distance control which essentially has a conventional design and additional hardware and/or software components for carrying out the invention-specific measures of the method. In particular, the speed regulator with distance control contains, in addition to the customary speed-control and distance-control units, a device for detecting lane change instructions which are triggered by a travel direction indicator, a device connected thereto for setting, after the detection of the triggering of an instruction for a lane change to the left, the desired distance ($d_s$) for the distance control to a value ($d_{s1}$) which is smaller than the value ($d_{sn}$) before the instruction for a lane change to the left was triggered, but is at least as large as a prescribed minimum distance ($d_{min}$), and a device for limiting the actual acceleration of the vehicle to a maximum value ($a_{max}$) during the time that an instruction for a lane change to the right is set, if a vehicle travelling in front moves out of the prescribed detection area in front of the vehicle. The measures implemented by the devices are described in the subsequent explanation of the method which can be carried out by the speed regulator with distance control. The realization of these devices and the implementation of the method as a whole in such a device is readily understood to be within the knowledge of one of ordinary skill in the art and does not require any detailed explanation here.

Figure 1:
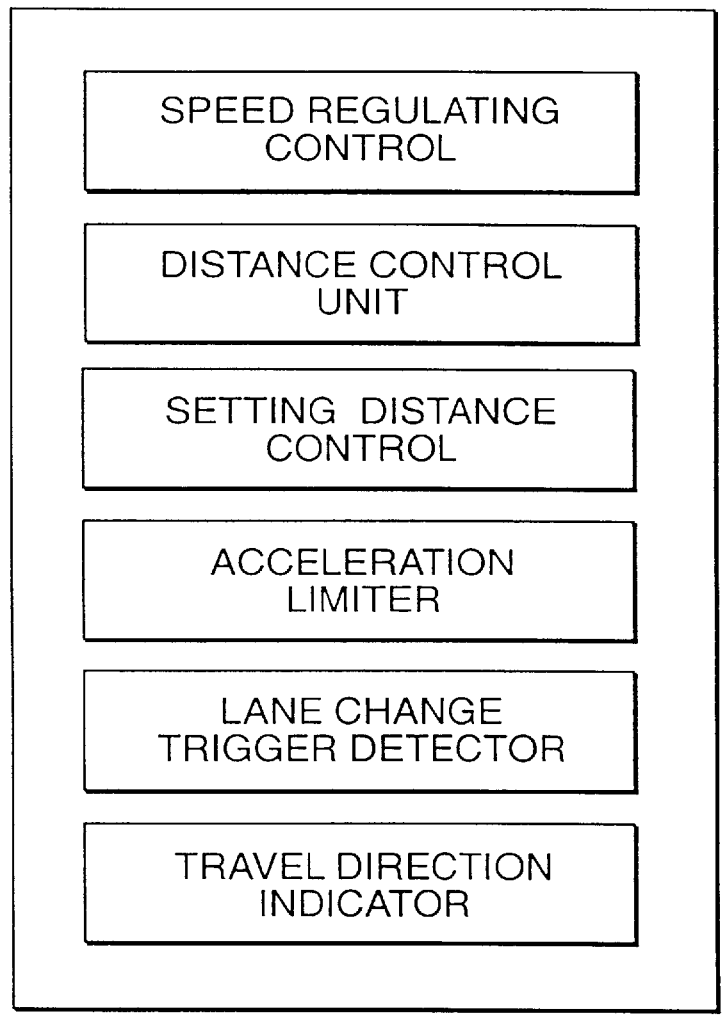
FIG. 1 is a schematic block diagram of a device according to the present invention.
Figure 2:
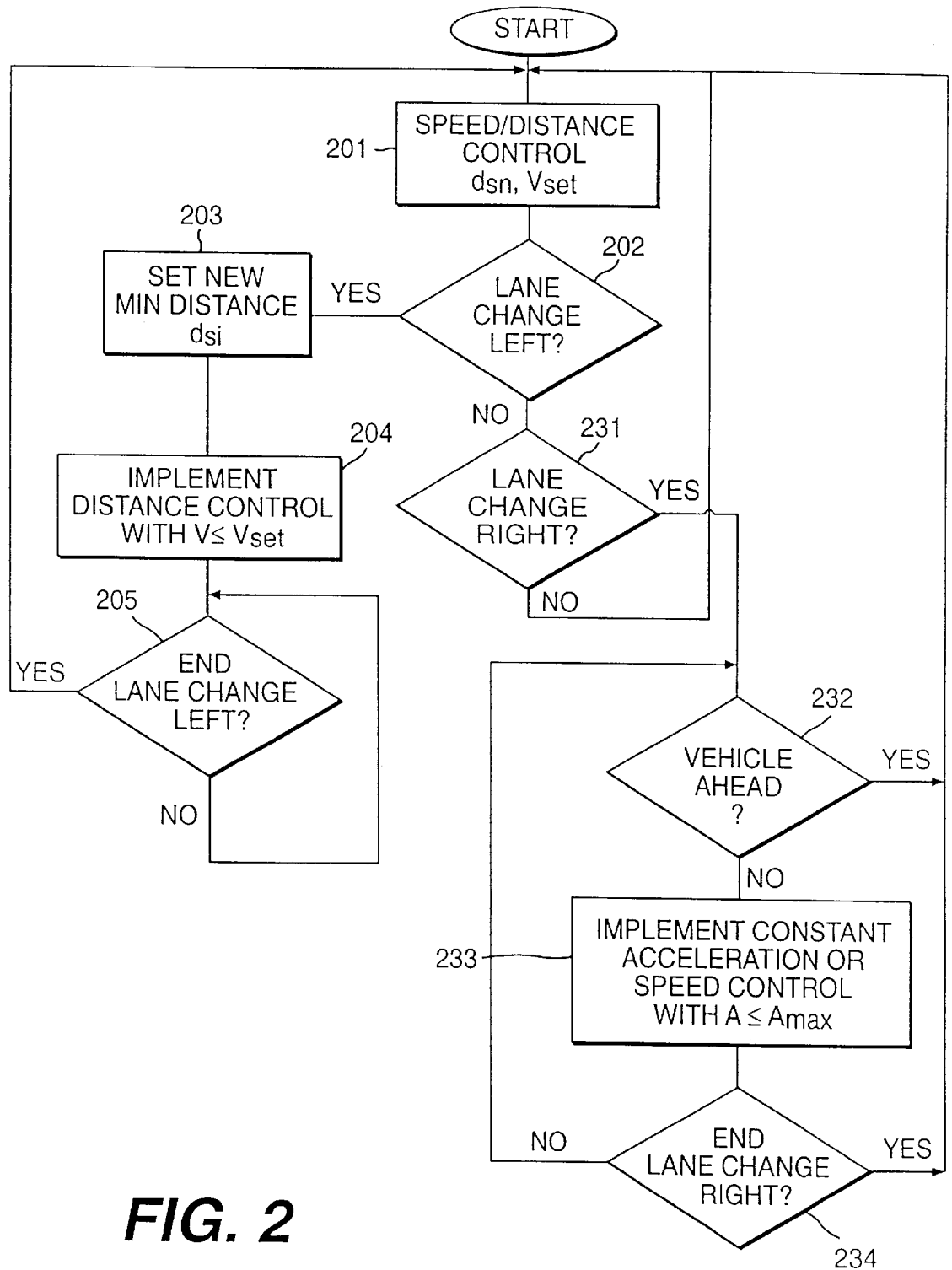
FIG. 2 is a flow diagram which illustrates the operation of a first embodiment of the method according to the invention.

According to the depicted in FIG. 2, in step 201, in the absence of a vehicle travelling in front within a prescribed detection area at the front, the speed regulator with distance control controls the actual speed of the vehicle about a desired speed value which can be set by the driver. As soon as a vehicle travelling in front within the prescribed detection area is detected, the speed regulator with distance control sets a desired distance ($d_s$) from the vehicle travelling in front. This desired distance ($d_s$) is speed-dependent, has a fixed component and, furthermore, can be matched adaptively to the weather, the time interval from the vehicle travelling in front and the driving characteristics. German Patent document DE 42 09 060 A1 mentioned above should be referred to for the practical realization of such an adaptive adjustment capability.

The desired distance ($d_s$) which is determined in such a driving-state-dependent way applies for distance control phases for as long as a travel direction indicator present in the vehicle is not actuated into a left-turn position. If, on the other hand, the latter occurs (step 202), which corresponds to setting an instruction for a lane change to the left, a new, reduced desired distance value ($d_{s1}$) is immediately set for the subsequent lane change phase (step 203). The desired distance value ($d_{s1}$) is equal to the larger value of the prescribed minimum distance ($d_{min}$) and the previous desired distance value ($d_{sn}$) which is reduced by a prescribed factor 1/k, where k is greater than one, i.e. $d_{s1}=\max\{d_{min}, d_{sn}/k\}$. This reduction of the desired distance ($d_s$), which is decisive for the distance control, to the new, reduced value ($d_{s1}$) has the result that, after the travel direction indicator has been set into the left-turn position of the speed regulator with distance control, the vehicle accelerates. Specifically, the vehicle accelerates at a maximum up to the desired speed which has been set, in order to reach the now smaller desired distance ($d_{s1}$) (step 204). In this manner, the overtaking maneuver can be carried out quickly.

A precondition for the vehicle acceleration is that before the request for a lane change to the left, the distance from the vehicle travelling in front is greater than the minimum distance ($d_{min}$) to be suitably prescribed. This avoids a vehicle driving up too close to the vehicle travelling in front at the start of the overtaking maneuver. As soon as the travel direction indicator is moved back out of the left-turn position, by being actuated into the straight-ahead position or the right-turn position (step 205) the process returns to step 201, and the desired distance ($d_s$), which is decisive for the distance control, is reset from the reduced value ($d_{s1}$) back to the normal value ($d_{sn}$).

Figure 3:
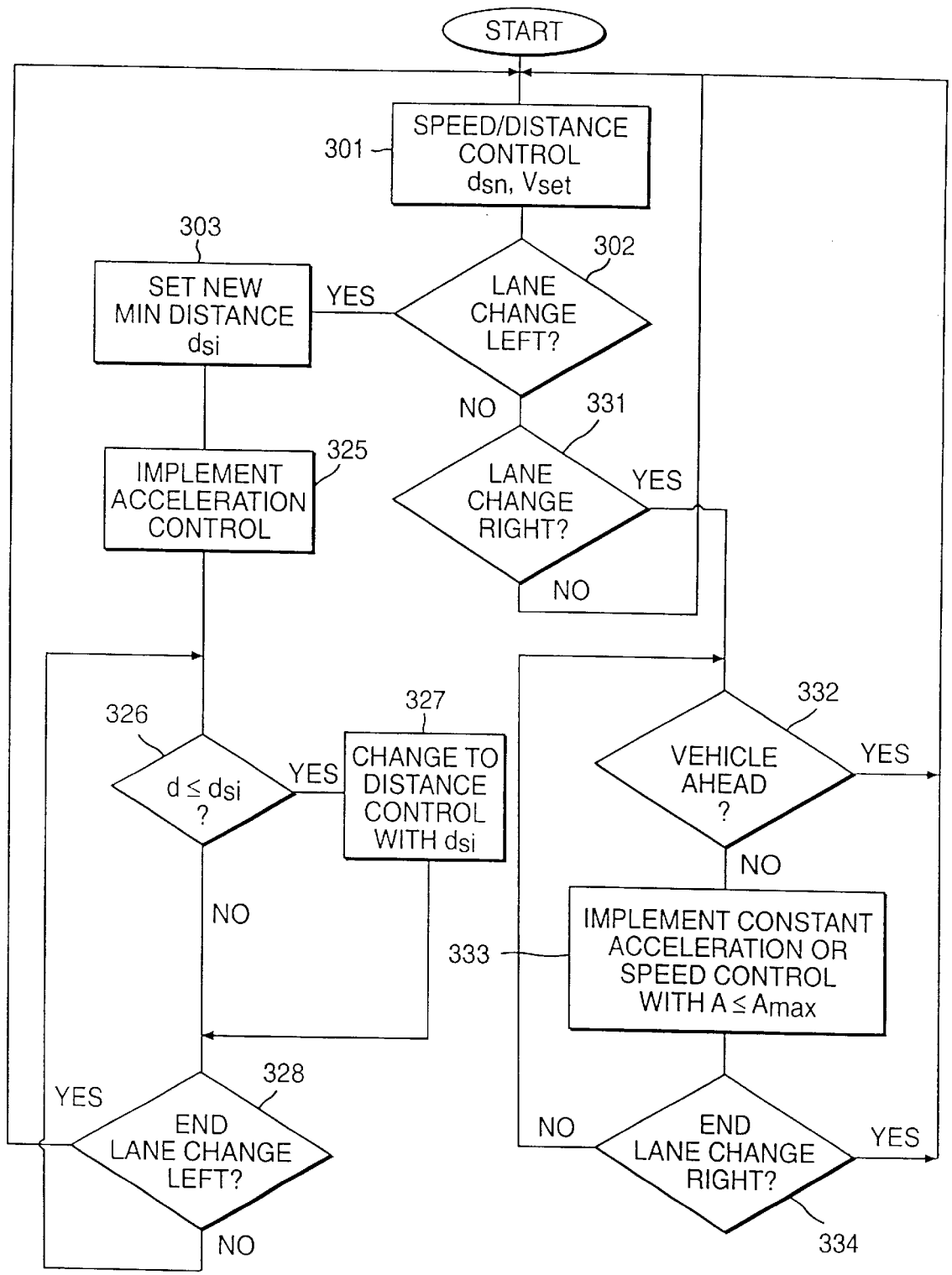
FIG. 3 is a flow diagram of an alternative embodiment of the method according to the invention.

As an alternative to this described prescription of a lower desired distance value while maintaining distance control, as depicted in FIG. 3 there may be a provision that when an instruction for a lane change to the left has been detected, the system switches off the distance control in order to subsequently be able to accelerate the vehicle quickly in order to prepare the overtaking maneuver. This can preferably take place through the use of an acceleration control (step 325) which is activated with the switching off of the distance control. In this context, in order to avoid excessively small, dangerous distances from the vehicle travelling in front, a minimum distance is prescribed in step 326. The minimum distance is smaller than the desired distance of the preceding distance control. When the distance reaches or drops below the minimum distance, the system switches off the acceleration control and changes back to the distance control (step 327).

If the vehicle is equipped with a device which permits not only the determination of the distance from a vehicle travelling in front of the same lane but also of the distance from vehicles travelling in front on the adjacent, left-hand lane, there may be provided, when required, for this information relating to the distance from the vehicle travelling in front on the left-hand lane also to be taken into account during the initiation, carried out automatically by the system, of an overtaking maneuver. The execution of the acceleration process, which initiates an overtaking maneuver, in the previous lane can then be made dependent, in a suitable way, on whether there is a vehicle travelling in front in the left-hand lane and, if appropriate, how large the respective instantaneous distance from the vehicle is.

According to the method, as shown in both FIGS. 2 and 3 a further adjustment measure to lane changes is carried out by the speed regulator with distance control in driving situations in which an instruction for a lane change to the right is set by actuating the travel direction indicator into the right-turn position (step 231, 331), and a vehicle travelling in front which has previously been located in the detection area of the vehicle moves out of this area without another vehicle in the new lane moving into the detection area (step 231 331). In such cases, in addition to the changing over from the previous distance control to the present speed control, a maximum value ($a_{max}$) for the actual acceleration of the vehicle is simultaneously specified at that point in time at which the vehicle travelling in front and previously located in the detection area (step 233, 333), leaves this area. The maximum value ($a_{max}$) is in this case specified to be equal to the larger value of the value zero and the actual acceleration value ($a_i$) at that point in time at which the vehicle travelling in front has left the detection area, i.e. $a_{max}=\max\{0,a_i\}$. In this case, decelerations are to be considered to be negative acceleration values. Without this measure, if the vehicle travels behind a vehicle travelling in front and subsequently changes over to the right-hand lane when the distance control is active with an actual speed which is reduced in comparison with the desired speed for speed control phases, it would accelerate in an undesired way in order to reach the set desired speed after the changing over from the distance control to the speed control. This is prevented by limiting the acceptable actual acceleration during this lane change. Instead, the lane change takes place without a jerky acceleration effect with constant acceleration if acceleration was already occurring at the time of the start of the lane change. Otherwise, the lane change takes place in a constant manner at the speed present at this point in time. As soon as the travel direction indicator is moved back out of the right-turn position into the left-turn position or straight-ahead position (step 234, 334), the limiting of the actual acceleration to the maximum value ($a_{max}$) is cancelled again and the system carries returns to step 201, 301, carrying on with the normal speed control of the speed regulator.

The description of the above example of the method implemented in a suitable speed regulator with distance control makes it clear that the method according to the invention and the device according to the invention have the ability to provide an automatic speed and distance control with a high degree of driving comfort even when changing lanes. In particular, fast overtaking maneuvers are permitted and undesired acceleration effects when changing lanes to a free right-hand lane for example a motorway exit, are prevented.

What is claimed is:

1. A method of operating a vehicle speed and distance control unit for automatically controlling a speed of a motor vehicle and its distance from a vehicle travelling in front, said speed and distance control unit having a device for entry of lane change instructions by a vehicle operator, the method comprising the steps of:

controlling the speed about a prescribed desired speed as long as no vehicle travelling in front is located within a prescribed detection area in front of the vehicle;

controlling the distance from a vehicle travelling in front about a prescribed desired distance as long as a vehicle travelling in front is located within the prescribed detection area in front of the vehicle; and after an instruction for a lane change in a predetermined lateral direction has been entered, setting a desired distance for the distance control to a value ($d_{s1}$) which is smaller than a value ($d_{sn}$) before the instruction for a lane change to the left was triggered, but which is at least as large as a prescribed minimum distance ($d_{min}$).

2. The method according to claim 1, wherein the desired distance value ($d_{s1}$) after the instruction for a lane change in said predetermined lateral direction has been entered is set to the larger value of the prescribed minimum distance ($d_{min}$) and a value ($d_{sn}/k$) which is smaller by a prescribed factor ($1/k$) than the value ($d_{sn}$) before the instruction for a lane change to the left was triggered.

3. A method of operating a vehicle speed and distance control unit for automatically controlling a speed of a motor vehicle and its distance from a vehicle travelling in front, said speed and distance control unit having a device for entry of lane change instructions by a vehicle operator, the method comprising the steps of:

controlling the speed about a prescribed desired speed as long as no vehicle travelling in front is located within a prescribed detection area in front of the vehicle;

controlling the distance from a vehicle travelling in front about a prescribed desired distance as long as the vehicle travelling in front is located within the prescribed detection area in front of the vehicle; and after an instruction for a lane change in a predetermined lateral direction has been entered, changing over from a distance control to an acceleration control, and prescribing a minimum distance, wherein acceleration control is terminated and distance control is implemented when the distance drops below the prescribed minimum distance.

4. A method for controlling a speed of a motor vehicle and its distance from a vehicle travelling in front, said motor vehicle having a device for detecting lane change instructions which are entered by a vehicle operator, the method comprising the steps of:

controlling the speed about a prescribed desired speed as long as no vehicle travelling in front is located within a prescribed detection area in front of the vehicle;

controlling the distance from a vehicle travelling in front about a prescribed desired distance as long as the vehicle travelling in front is located within the prescribed detection area in front of the vehicle; and limiting an actual acceleration of the vehicle to a maximum value ($a_{max}$) if the vehicle travelling in front moves out of the prescribed detection area in front of the vehicle during a time that an instruction for a lane change in a predetermined lateral direction is set.

5. The method according to claim 4, wherein the maximum value ($a_{max}$) which limits actual acceleration is set equal to the actual acceleration ($a_i$) when the vehicle travelling in front moves out of the prescribed detection area in front of the vehicle, if the actual acceleration ($a_i$) is positive, and otherwise the maximum value is set to zero.

6. A device for automatically controlling a speed of a motor vehicle and its distance from a vehicle travelling in front, the device comprising:

a speed control unit for controlling motor vehicle speed about a prescribed desired speed as long as no vehicle travelling in front is located within a prescribed detection area in front of the motor vehicle;

a distance control unit for controlling distance of the motor vehicle from the vehicle travelling in front about a prescribed distance as long as a vehicle travelling in front is located within the prescribed detection area in front of the motor vehicle;

means for detecting entered lane change instructions from an operator of said vehicle; and means which, after entry of an instruction for a lane change in a predetermined lateral direction has been detected, set the desired distance for the distance control to a value which is smaller than the value before the instruction for a lane change in said predetermined lateral direction was entered, but is at least as large as a prescribed minimum distance.

7. A device for controlling a speed of a motor vehicle and its distance from a vehicle travelling in front, the device comprising:

a speed control unit for controlling motor vehicle speed about a prescribed desired speed as long as no vehicle travelling in front is located within a prescribed detection area in front of the motor vehicle;

a distance control unit for controlling distance of the motor vehicle from the vehicle travelling in front about a prescribed desired distance as long as the vehicle travelling in front is located within the prescribed detection area in front of the motor vehicle;

means for detecting entered lane change instructions from an operator of said vehicle;

means which, after entry of an instruction for a lane change in a first predetermined lateral direction has been detected, set the desired distance for the distance control to a value which is smaller than the value before the instruction for a lane change in said first predetermined lateral direction was entered, but is at least as large as a prescribed minimum distance; and means for limiting actual acceleration of the motor vehicle to a maximum value during detection of an entered instruction for a lane change in a second predetermined lateral direction if a vehicle travelling in front moves out of the prescribed detection area in front of the motor vehicle.

8. A device for automatically controlling a speed of a motor vehicle and its distance from a vehicle travelling in front, the device comprising:

a speed control unit for controlling motor vehicle speed about a prescribed desired speed as long as no vehicle travelling in front is located within a prescribed detection area in front of the motor vehicle;

a distance control unit for controlling distance of the motor vehicle from the vehicle travelling in front about a prescribed desired distance as long as the vehicle travelling in front is located within the prescribed detection area in front of the motor vehicle;

means for detecting entered lane change instructions from an operator of said vehicle; and means for limiting actual acceleration of the motor vehicle to a maximum value during detection of a set instruction for a lane change in a predetermined lateral direction if a vehicle travelling in front moves out of the prescribed detection area in front of the motor vehicle.

* * * * *